United States Patent [19]

Schneider

[11] 4,104,707

[45] Aug. 1, 1978

[54] ELECTRONIC FLASHLIGHT FOR DIRECT AND INDIRECT FLASHING

[75] Inventor: Arthur Schneider, Völkenrode, Germany

[73] Assignee: Rollei-Werke Franke & Heidecke, Germany

[21] Appl. No.: 822,561

[22] Filed: Aug. 8, 1977

[30] Foreign Application Priority Data

Aug. 25, 1976 [DE] Fed. Rep. of Germany ... 7626537[U]

[51] Int. Cl.$^2$ ............................................. G03B 15/02
[52] U.S. Cl. ......................................... 362/17; 362/18; 362/281; 362/319; 362/343
[58] Field of Search ..................... 240/1.3; 362/17, 18; 362/281, 319, 343

[56] References Cited

U.S. PATENT DOCUMENTS 3,794,822   2/1974   Bergmans .............................. 240/1.3

Primary Examiner—Stephen J. Lechert, Jr.
Attorney, Agent, or Firm—Ernest F. Marmorek

[57] ABSTRACT

In a light-generating electronic flashlight which has a reflector and first and second discs which may be selectively placed ahead of the reflector for normal and wide-angled illumination of an object to be photographed, respectively, the improvement includes third and fourth discs which may be placed ahead of the reflector. Each of the third and fourth discs have parallel prismatic elements for unilateral deflection of the light generated by the flashlight for the third and fourth discs to displace the flashlight-generated light upwardly and laterally, when the third and fourth discs are placed ahead of the reflector, respectively, and upon the flashlight being in an upright position and directed towards the object to be photographed.

7 Claims, 2 Drawing Figures

ELECTRONIC FLASHLIGHT FOR DIRECT AND INDIRECT FLASHING

BACKGROUND OF THE INVENTION

The present invention relates to an electronic flashlight having a reflector and first and second discs which may be placed ahead of the reflector for normal and wide-angle illumination of an object to be photographed, the improvement including third and fourth discs which may be placed ahead of the reflector for unilateral deflection of the light generated by the flashlight for the third and fourth discs to replace the flashlight-generated light upwardly and laterally, respectively.

A known flashlight of this type includes a cylindrically-shaped reflection unit, a reflector being rotatably supported on the reflector unit, and being pivotable from a first position for direct flashing into at least a second position for indirect flashing. There is additionally provided a reflector disc cylindrically surrounding the reflector, which is composed of two partial discs, each of the two partial discs being placeable by rotation of the cylindrical reflecting unit ahead of the reflector opening. While one of the reflector discs is made of transparent material and causes the object to be photographed to be normally illuminated, the other partial disc includes prismatic elements causing a widening or broadening of the light leaving the prismatic elements for achieving a wide-angle illumination of the object to be photographed. By means of such an arrangement, it is possible to flash selectively directly or indirectly upon the electronic flashlight being in upright position, and by changing the reflector discs ahead of the reflector, so that the flashlight is set for the requirements of a wide-angle objective coupled to the photographic camera.

It is a disadvantage of such a flashlight that it has a relatively complicated mechanical construction, which is due particularly to the pivotable construction of the reflector, the associated and relatively costly provision for feeding current between movable parts of the camera apparatus, and additionally due to the fact that indirect flashing is not possible if the camera is housed so as to produce a rectangular image, the longer side of which is upright; for in a reflector position displaced by 90° with respect to the basic position of the flashlight, only light deflected by the displaced reflector is deflected, not to the generally well reflecting ceiling of the room, but is deflected laterally, the lateral walls of a room providing only rarely good conditions for light deflection.

SUMMARY OF THE INVENTION

It is therefore one of the objects of the invention to substantially simplify the construction of a flashlight of the initially described kind and to simultaneously make it possible to obtain indirect flashing with respect to the ceiling of a room, even in a position of the flashlight displaced by 90° from its initial position, namely upon taking a photograph, the longitudinal side of which is in an upright position.

The invention accordingly includes, in a light-generating electronic flashlight having a reflector and first and second discs selectively placeable ahead of the reflector for normal and wide-angled illumination of an object to be photographed, respectively, the improvement wherein third and fourth discs may be placed ahead of the reflector, and each of the third and fourth discs have parallel prismatic elements for unilateral deflection of the light generated by the flashlight for the third and fourth discs to displace the flashlight-generated light upwardly and laterally, when the third and fourth discs are placed ahead of the reflector, respectively, and upon the flashlight being in an upright position and directed towards the object to be photographed.

By the simple placement of a reflector disc ahead of the reflector, which is constructed so as to deflect the light appropriately, it is possible to flash indirectly towards the ceiling when using a camera with a flashlight rigidly attached thereto, not only when photographing an object having a longitudinal side placed horizontally, but also when that longitudinal side is positioned in a vertical direction, without having to disengage the flashlight from the camera.

Additionally, in the case of dispersing or deflecting reflector discs, which deflect not the entire light, but only part thereof, and permit a portion of the light to pass therethrough, the object to be photographed is additionally illuminated directly even in the indirect flashing method, so that in extreme cases of an object to be photographed, shadows forming due to any edges projecting from the object to be photographed on the lower side thereof are avoided, when using the indirect flashing method.

Furthermore, the mechanical construction of a flashing light is considerably simplified since the reflector no longer has to be movable and therefore does not require any special provisions for feeding the current between the flashing light and the electronic switching of the apparatus.

It is preferable if a carrier is disposed on the housing of the flashlight, and is selectively rotatable to first, second, third, and fourth positions; each of the positions are displaced 90° from two neighboring positions corresponding to a different one of the discs being placed ahead of the reflector. It is also advantageous if the third and fourth discs may be pivotably placed ahead of the reflector.

The carrier preferably has the shape of an annular disc which slightly projects from the housing of the flashlight. The carrier may then be rotated manually, and the desired disc may be placed ahead of the reflector.

It is preferable if the housing is formed with an opening in the region of the reflector, if the housing additionally includes a front portion, and if a gap is formed between the front portion and the remaining portion of the housing so that the carrier may be disposed in the gap, and the discs mounted on the carrier.

In so-called computer-operated flashlights, namely flashlights having automatic exposure control, it is frequently desirable, when switching from normal to wide-angle illumination, or in the case of indirect flashing, to have a different shutter opening associated with the flashlight. In this case, the computer of the flashlight must also be switched over, which is accomplished in a further refinement of the invention, by providing a sensor for automatic flashlight control means for receiving light deflected from the object to be photographed, and for automatically controlling the exposure of a photographic camera coupled to the flashlight, respectively; a filter is then provided which is associated with at least one of the discs to position the filter automatically ahead of the sensor upon positioning the selector disc ahead of the reflector. An appropriate change of shutter opening will be associated with the selected reflector disc; the filter and the computer suitably cooperate, the computer then operates in the wide angle region, or when flashing indirectly at the new shutter opening.

Additionally, a correction of the light radiated by the flashlight is possible in the case of such filters, when changing from direct flashing to indirect flashing without having to switch over the shutter, so that the photographic images are optimally exposed even in indirect flashing. Such a switching-over may be necessary, or at least desirable, since the computers are conventionally set so that they cause the discharge to be terminated prematurely, namely the flashlight generates less light than would be required, based on the luminosity or intensity determined by the sensor of the computer. This is due to the fact that conventionally the subject to be photographed is disposed in front of a background-reflecting light, and that upon taking a flashlight photograph the sensor takes into account the total light reflected by the subject to be photographed, as well as by the background, the sensor effectively averaging the total amount of light reflected. If the flashing light discharge were to be terminated at a value, where the total amount of light measured yields an optimum exposure of the photographic image, then the subject to be photographed would be over-exposed. A short premature termination of the radiated light prevents this, but results in an un er-exposure of the background which, however, is not of interest. When using indirect flashing, however, the background, as well as the subject to be photographed are illuminated with equal intensity, since in the case of diffused scattering of the light no importance is to be attached to the basically different respective distances from the camera of the subject to be photographed and that of the background. Any premature termination of the flashing light radiated will result in an under-exposure of the subject photographed, which in a further refinement of the invention can be prevented by placing a filter ahead of the sensor; the filter renders the sensor insensitive, and therefore prolongs the light radiated by the required amount.

It is therefore preferable if a flashlight includes a sensor, automatic flashlight control means for receiving light reflected from the object to be photographed, and for automatically controlling the exposure of a photographic camera which may be coupled to the flashlight, respectively, and a filter associated with at least one of the discs for positioning the filter automatically ahead of the sensor upon positioning at least one of the discs ahead of the reflector.

BRIEF DESCRIPTION OF THE DRAWINGS

For a fuller understanding of the nature and objects of the invention, reference should be had to the following detailed description, taken in connection with the accompanying drawings in which.

DESCRIPTION OF THE PREFERRED EMBODIMENTS

Figure 1:
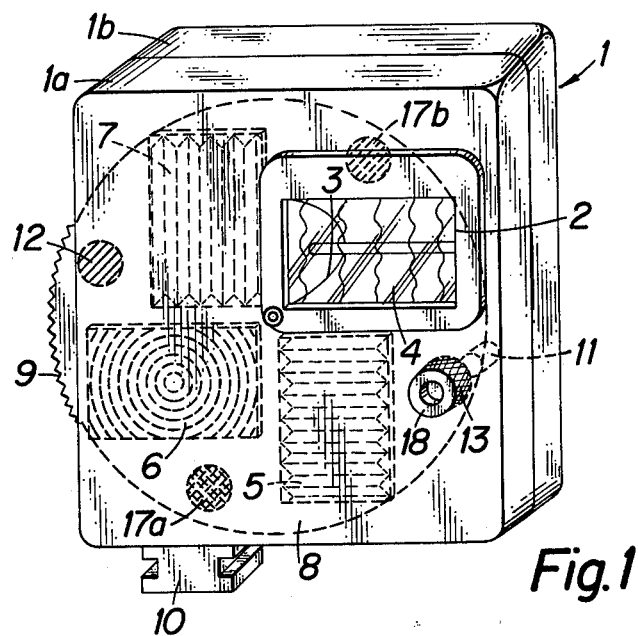
FIG. 1 shows a flashlight, including a carrier disposed in the interior thereof for reflector discs.

In carrying the invention into effect, there is shown a housing 1 of the flashlight, which is constructed in two parts and consists of a front side 1a, and a rear 1b. The front side 1a is formed with an opening 2, behind which there is disposed a reflector 3. A gap is formed between the housing front wall and the reflector in an axial direction, which permits the movement therethrough of a disc-like carrier 8 rotatably disposed in the interior of the housing, and which includes four reflector discs 4, 5, 6, and 7 for movement or rotation between the reflector 3 and the opening 2 of the housing.

The individual reflector discs 4 through 7 are of the same shape, and have at least the same minimal dimensions as the opening 2 of the housing. The four reflector discs are displaced by 90° with respect to the carrier 8, so that one of the four discs may be placed ahead of the reflector 3, or behind the opening 2 of the housing by rotation of the carrier. For this reason, the disc-like carrier 8 projects on one side of the housing slightly therefrom and is knurled along its periphery.

The disc 4 is made of a normally transparent material, and is pivoted ahead of the reflector 2, if normal exposures are to be made using standard objectives, for example, using small-image cameras having a standard objective of a focal length of 50 millimeters. The reflector disc 6 includes prismatic elements for widening the beam of light with respect to the disc 4, and is pivoted into a position ahead of the reflector for a photograph having a wide-angle objective. The reflector disc 7 includes prismatic elements which are disposed in a parallel fashion in such a manner that the light reflected by the reflector is radiated upwardly in the normal position of the flashlight shown in FIG. 1, namely deflected towards the ceiling when the flashlight is attached to a non-illustrated camera by means of an attachment device 10, the camera being disposed to take a rectangular photograph with the longitudinal side disposed horizontally. The reflector disc 5 includes the same prismatic elements, which are, however, disposed in such a manner, so that in the positions shown in FIG. 1, the light reflected from the reflector is deflected laterally, namely to the right, as shown in the drawing. When the flashlight is disposed on the camera, and when the camera is set for taking upright pictures, namely rectangular pictures, the longitudinal side of which is in a vertical position, and since the flashlight is disposed on the right side of the camera and rotated with respect to its normal position by 90°, the light is consequently deflected by this arrangement of the prismatic elements on the reflector disc 5 in the direction of the ceiling. The reflector disc 5 must therefore be pivoted into position ahead of the reflector opening, if indirect flashing is desired, when taking upright pictures. Indirect flashing when taking horizontal pictures is, however, obtained by the use of the reflector disc 7.

In so-called computer flashing devices, namely flashing devices having automatic flashlight control means in dependence of light reaching a sensor from light reflected from a subject to be photographed, the reflected light being measured thereby, it is frequently desirable, as has already been stated, to reduce the so-called operative shutter opening of the camera, so as to be able to retain the maximum distance of the flashlight, from the object to be photographed, or so as to be able to correct the amount of light radiated from the flashlight during a transition from direct flashing to indirect flashing. In such cases, it is desirable also to appropriately adjust the computer. For this reason, a filter 12 is disposed on the disc-like carrier 8, so that the filter 12 is disposed ahead of the sensor 11 upon rotation of the carrier 8 into a position, in which the disc 6 is disposed ahead of the reflector opening, the sensor 11 being disposed behind an opening 18 formed in the housing 1. In the basic position of the carrier 8 shown in FIG. 1, a further filter 13 of greater density is disposed ahead of the sensor 11.

Filters 12 and 13 are matched to the computer at respective operative shutter openings. The computer may, however, also be calibrated, so that there is provided only an opening instead of the filter 12, so that the sensor is fully effective in the case of wide-angled illumination, while it is covered in the normal position by the filter 13, the latter having a different density.

Additional filters 17 and 17b may be automatically pivoted into position ahead of the sensor 11 upon placing the discs 5 and 7 ahead of the reflector.

Figure 2:
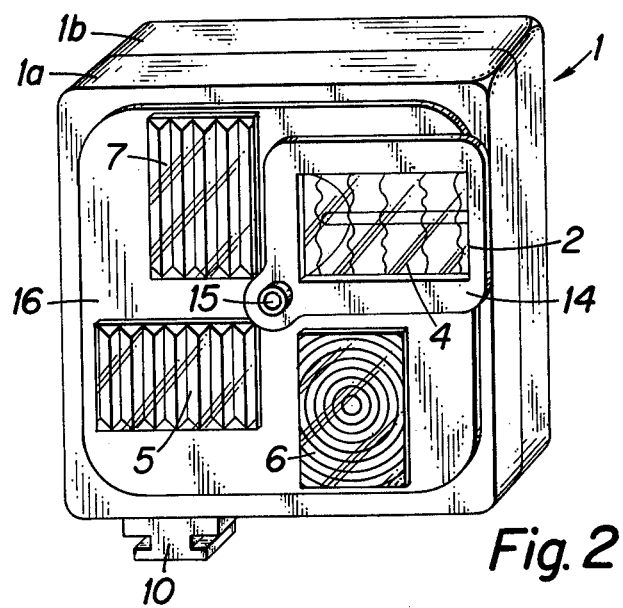
FIG. 2 shows a flashlight having a carrier disposed on the front of the housing.

The flashing apparatus shown in FIG. 2 differs from the flashlight of FIG. 1 substantially by a carrier 16 including the reflector discs 4 through 7, being rotatable on the front side of the housing 1 about a rigid axle 15. By rotation of the carrier 16, a respective reflector disc is placed ahead of the opening 2, and thereby ahead of the reflector. A stationary rectangularly shaped disc or frame 14 is disposed ahead of the opening of the housing, which disc is disposed at a distance from the opening of the housing, so that the carrier is movable between the opening of the housing and the disc. The frame 14, which is provided with an opening for the light, is rigidly attached to the center of the housing at the front thereof, and serves to protect the carrier 8 against any axial deflection during rotation of the carrier.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a light-generating electronic flashlight including a housing, a light source and a reflector mounted in said housing, primary disc means connected to said housing and being movable among a plurality of positions including one position in a light path between the reflector and an object to be illuminated from the light source, the light source being disposed between said reflector and said one position, comprising, secondary disc means movable to and from said one position for unilateral deflection of the light from said light source in at least one of a plurality of selectable directions, and upon the light source pointing in the selected direction.

2. A flashlight according to claim 1 wherein said primary disc means includes first and second discs movable to said one position for the normal and wide-angled illumination of the object, respectively, and wherein said secondary disc means includes third and fourth discs movable to said one position for unilateral deflection of the light source generated light in first and second of said plurality of selectable directions, respectively, upon placing said third and fourth discs in said one position, and upon the light source pointing in said first and second directions, respectively.

3. A flashlight according to claim 1, further comprising a carrier disposed on said housing and selectively rotatable to first, second, third and fourth locations, each of said locations being angularly displaced by predetermined angles from two neighboring locations, respectively, corresponding to a different one of said discs being placed in the light path between said reflector and said object.

4. A flashlight according to claim 3, wherein said carrier has the shape of a knurled disc slightly projecting from said housing.

5. A flashlight according to claim 3, wherein said housing has an opening in the region of the reflector, and wherein the carrier is disposed in said opening, said discs being mounted on said carrier.

6. A flashlight according to claim 1, wherein said secondary disc means are pivotally movable to and from said one position.

7. A flashlight according to claim 1, further comprising a light sensor for receiving light through a reflected light path from the object to be photographed, automatic flashlight control means for automatically controlling the exposure of a photographic camera which may be coupled to the flashlight, and a filter associated with at least one of said disc means for positioning said filter automatically in said reflected light path upon positioning said one of said disc means in said light path between said reflector and said object.

* * * * *